United States Patent [19]

Klingensmith et al.

[11] Patent Number: 4,595,165

[45] Date of Patent: Jun. 17, 1986

[54] ADJUSTABLE ANCHORING ASSEMBLY

[75] Inventors: James D. Klingensmith, Apollo; Lyle W. Hovland, Murrysville, both of Pa.

[73] Assignee: Aluminum Company of America, Pittsburgh, Pa.

[21] Appl. No.: 680,947

[22] Filed: Dec. 24, 1984

[51] Int. Cl.[4] ............ A01K 97/10

[52] U.S. Cl. ............ 248/539; 248/230; 248/534; 343/892

[58] Field of Search ............ 248/539, 230, 534, 65, 248/297.2, 200, 509; 343/892, 880, 888; 410/150, 130

[56] References Cited

U.S. PATENT DOCUMENTS

| | | | |
|---|---|---|---|
| 2,671,937 | 3/1954 | Finke | 248/539 |
| 2,831,339 | 4/1958 | Jones | 248/65 |
| 2,970,799 | 2/1961 | Pinson | 248/230 |
| 3,347,572 | 10/1967 | Pfaff et al. | 248/230 |
| 3,358,952 | 12/1967 | Burns | 248/539 |
| 4,406,386 | 9/1983 | Rasor et al. | 248/297.2 |
| 4,500,064 | 2/1985 | Calabro | 248/539 |

FOREIGN PATENT DOCUMENTS

| | | | |
|---|---|---|---|
| 1270497 | 7/1961 | France | 248/230 |
| 2471057 | 6/1981 | France | 343/892 |

OTHER PUBLICATIONS

Andrew Corporation Catalog #21–Oct./21/1957, p. 71.

*Primary Examiner*—Ramon S. Britts
*Assistant Examiner*—Ramon O. Ramirez
*Attorney, Agent, or Firm*—Brian D. Smith

[57] ABSTRACT

A mounting structure for satellite dish antennae and method and means for anchoring the structure to the roof or sidewall of a typical residential building, such as a house, are disclosed. The mounting structure includes a mast for supporting the dish antennae. The anchoring means includes a bar having a back portion and sides which define an open-ended channel. The sides of the bar are further provided with integral adjoining lips which extend the length of the bar. Also included in the assembly is a clamp provided with holes through which bolt means may be inserted to tighten and secure the clamp about the mounting structure's mast to the bar's lips. When so tightened, the clamp tightly engages the external surface of the mast to prevent it from torsional movement relative to the clamp.

9 Claims, 5 Drawing Figures

ADJUSTABLE ANCHORING ASSEMBLY

FIELD OF THE INVENTION

The invention relates generally to a mounting structure for antennae, and more particularly to an anchoring assembly for a satellite dish antenna's mounting structure.

BACKGROUND OF THE INVENTION

Signals (typically television signals as contemplated herein) transmitted by geostationary satellites are generally received on the ground by parabolic dish antennae. The strength of the signal being transmitted determines the size or diameter of the dish required for reception (i.e., weaker signals require larger dishes). At the present time, signals being transmitted generally require a dish having a diameter of three meters or more for proper reception. In the near future, however, it is anticipated that satellites transmitting more powerful signals will be put into orbit, thereby permitting the use of dish antennae having greatly reduced diameters. Such dishes will obviously cost less than today's large dishes. Accordingly, it is expected that many homeowners and owners of apartment buildings will want to purchase the smaller dish for television viewing in the home or apartment. As a consequence, the dish will require installation or mounting on a variety of rooftops of varying slopes and configurations. Accordingly, the dish's mounting structure will have to be capable of supporting the dish on such surfaces and should do so in a manner that rigidly and securely fixes the dish since proper reception therewith requires that the dish accurately maintain its preset alignment with the transmitting satellite.

Strong winds are particularly troublesome in that such can move the dish out of its preset alignment with the transmitting satellite. To prevent this from happening, it has been established that the satellite dish's total pointing error should not exceed 0.5° in winds up to 50 mph. For safety reasons, it is also desirable that the mounting structure have the capacity to resist 100 mph wind loads without failure and without loss of the dish. Furthermore, the mounting structure should be capable of withstanding such wind speeds without damaging the roof or other surface to which it is attached. Accordingly, to meet these objectives, the mounting structure should be very rigid and it should be able to distribute loads to its mounting surface without causing significant damage thereto.

SUMMARY OF THE INVENTION

The present invention addresses the aforementioned concerns by providing a mounting structure for satellite dish antennae and means for anchoring the structure to the roof or sidewall of a typical residential building, such as a house. The structure includes a mast for supporting the dish antennae. The anchoring means includes a bar of predetermined length, width and depth. The bar has open ends of said width and depth and a substantially planar back portion which extends the length of said bar. The bar's back portion is also provided with holes through which bolts or lag screws may be inserted to secure the bar to the building which must be a rigid structure, such as a building's sidewall framing or roof rafters. The lengthwise edges of the bar's back portion integrally adjoin opposing, parallel and planar sides which extend the predetermined depth out from the lengthwise edges at right angles with respect to the bar's planar back portion. At this predetermined depth, integral lips adjoin the sides. The lips are directed inwardly towards the opposing side of the bar and downwardly towards the bar's back portion. The lips also extend the predetermined length of said sides so as to define a front opening area which is parallel to and opposes the bar's back portion. The back portion, sides and lips define an internal channel which also extends the length of the bar. In addition, the open ends of the bar define side openings to the channel.

Two nuts are disposed in the internal channel defined by the bar. The nuts are sized and configured to (1) be easily inserted into the channel through either the bar's side openings or front opening area, and (2) be capable of being restrained by said lips from passing through the front opening area.

Also included in the assembly is a clamp having a base portion which defines two bolt holes. The first bolt hole is located a predetermined distance from one end of the base portion and the second bolt hole is preferably located the same predetermined distance from the other end of the clamp's base portion. The clamp also has two opposing planar and parallel sides which extend out from the lengthwise edge of the base portion at right angles with respect to the base portion. The sides extend a predetermined distance and terminate in a fashion that defines an exposed edge having an arcuate portion which is sized to mate with a portion of the mast's external surface so as to anchor the mast and prevent it from torsional movement.

Also included is means for tightly securing the clamp, mast and bar together. The means includes a first and second bolt. The first bolt is inserted through the first bolt hole and has one end tightly fastened to the clamp. The first bolt's other end is tightly fastened to one of the nuts disposed in the channel. The second bolt is inserted through the second bolt hole and it also has one end also tightly fastened to the clamp. Similarly, the second bolt's other end is tightly fastened to the other nut disposed in the channel. The nuts are spaced apart a distance at least equal to the mast's diameter, and the ends of the bolts are tightly fastened such that both arcuate edge portions of the clamp tightly engage the external surface of the mast to prevent it from torsional movement relative to the clamp.

DETAILED DESCRIPTION OF THE PREFERRED EMBODIMENTS

Figure 1:
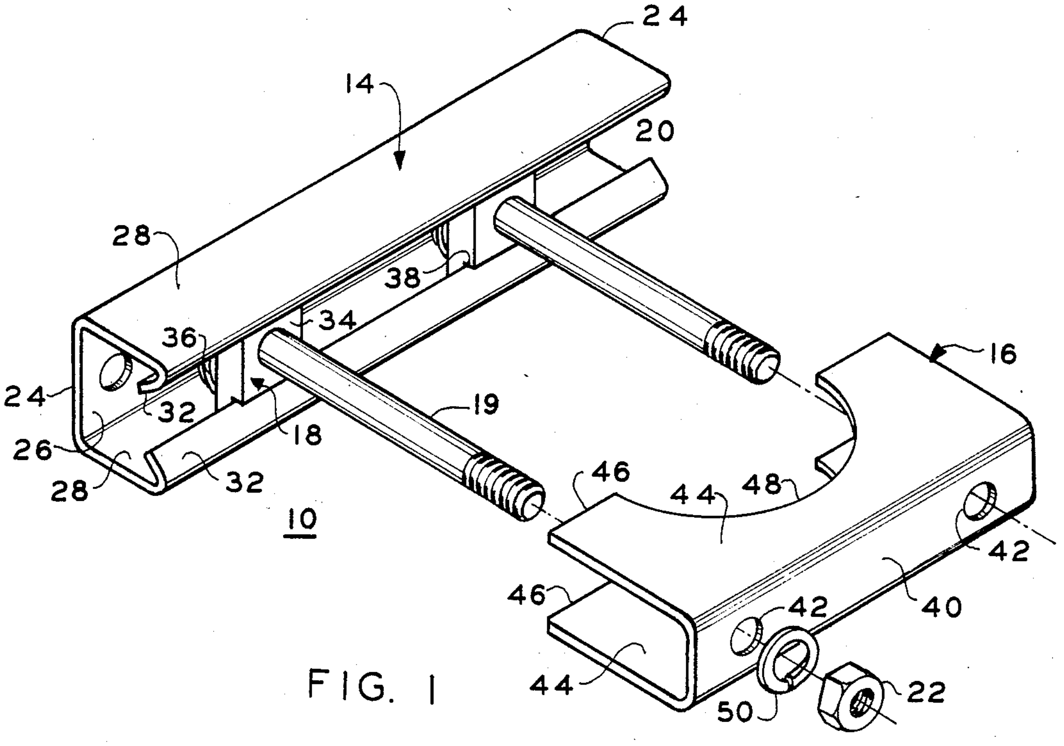
FIG. 1 is an exploded perspective view of the anchoring assembly of the present invention.
Figure 2:
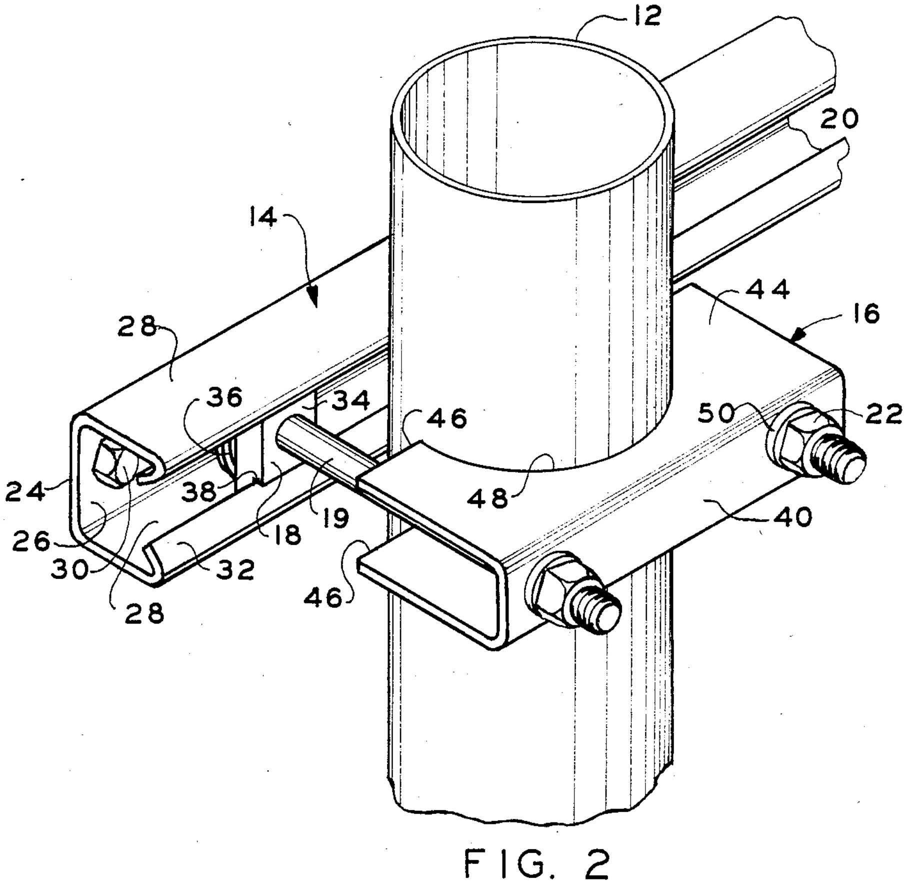
FIG. 2 is a perspective view of the assembly of FIG. 1 illustrating the assembly claimed about a mast of the mounting structure of the present invention.

FIG. 1 is a perspective view of an assembly 10 of the present invention for anchoring a cylindrical member subject to torsional loads, such as the support mast for a satellite dish antenna. FIG. 2 illustrates the assembly tightly fastened to such a mast 12. In general, the assembly includes (1) a channel defining bar member generally referred to as a bar 14 which is commercially available in different sizes from the Unistrut Division of GTE Products Corporation; (2) a clamp half 16 similar to the half of a muffler clamp which envelops an exhaust pipe in an automobile exhaust system; (3) two stud nuts 18 having threaded bolt shank portions 19, the nut portions (not numbered) of which are easily inserted into a channel 20 which is defined by the bar 14; and (4) nuts 22 which fasten tightly to stud nuts which are disposed in channel 20 such that when the clamp, mast and bar are tightly secured together, relative movement, particularly torsional movement, between clamp 16 and mast 12 is prevented.

Bar 14, as can be seen in FIGS. 1 and 2, has open ends 24 which are defined by the ends of the bar's back portion 26 and sides 28. Back portion 26 is planar and it extends the length of bar 14. Holes (not shown or numbered) are also provided in the bar's back portion. Bolts or lag screws, such as lag screw 30, may be inserted through these holes to secure the bar to a rigid structure, such as a building's sidewall frame or roof rafters. Sides 28 are also preferably planar and each integrally adjoins its respective lengthwise edge of back portion 26 and extends outwardly therefrom at right angles. Sides 28 also oppose one another and are parallel to each other. In addition, sides 28 extend outwardly a predetermined distance, at which point each side terminates by integrally adjoining a lip 32 of bar 14. Lips 32, as depicted, are preferably directed inwardly towards the opposing bar side and downwardly towards the bar's back portion. The area between the lips which opposes and is parallel to back portion 26 is referred to as the front opening area (not numbered). Channel 20, as illustrated in FIGS. 1 and 2, is defined by the bar's sides, back portion and lips.

As previously mentioned, stud nuts 18 are disposed in channel 20. In addition to being easily inserted into channel 20, when so inserted, each nut should be sized and configured to be resistant to rotational movement in at least one direction about its nut face 34 when face 34 is parallel to and facing the front opening area. In FIGS. 1 and 2, such resistance is provided by affixing a spring 36 to the back face (not shown or numbered) of each nut 18 which urges face 34 of each nut 18 up against the bar's lips 32. Face 34 can then be rotated until its upper and lower grooves 38 engage lips 32, at which point further rotation of nut 18 will be prevented and the assembly can be tightened.

Clamp half 16 has a base portion 40 which defines two symmetrically located bolt holes 42, each of which is preferably located a predetermined distance from its respective end of the base portion. The clamp half also has two opposing planar and parallel sides 44, each of which extends out from its respective lengthwise edge of the base portion at right angles with respect to said base portion. Each of the sides extends a predetermined distance (i.e., preferably a distance greater than half the mast's diameter) and terminates in a fashion that defines an exposed edge 46 having a symmetrical, centrally located arcuate portion 48. As depicted in FIG. 2, arcuate edge portion 48 is sized to mate with a portion of the mast's external surface to restrict torsional movement of the mast relative to the clamp's arcuate portion 48. While the edge of arcuate portion 48, as illustrated in FIG. 1, is smooth, it could be serrated or toothed. As such, it would provide even greater resistance to torsional movement.

The mast, bar and clamp are tightly secured together, as depicted in FIG. 2, by threading nuts 22 with a lock washer 50 onto the exposed ends of stud nut shanks 19 until the entire assembly is tightened such that the mast is prevented from torsional movement within the arcuate portion 48 of clamp 16.

While the embodiments depicted in FIGS. 1 and 2 employ stud nuts 18 and nuts 22 to tighten the assembly, other means apparent to those skilled in the relevant art of tightening clamp 16 to bar 14 are considered to be within the purview of the present invention.

Figure 3:
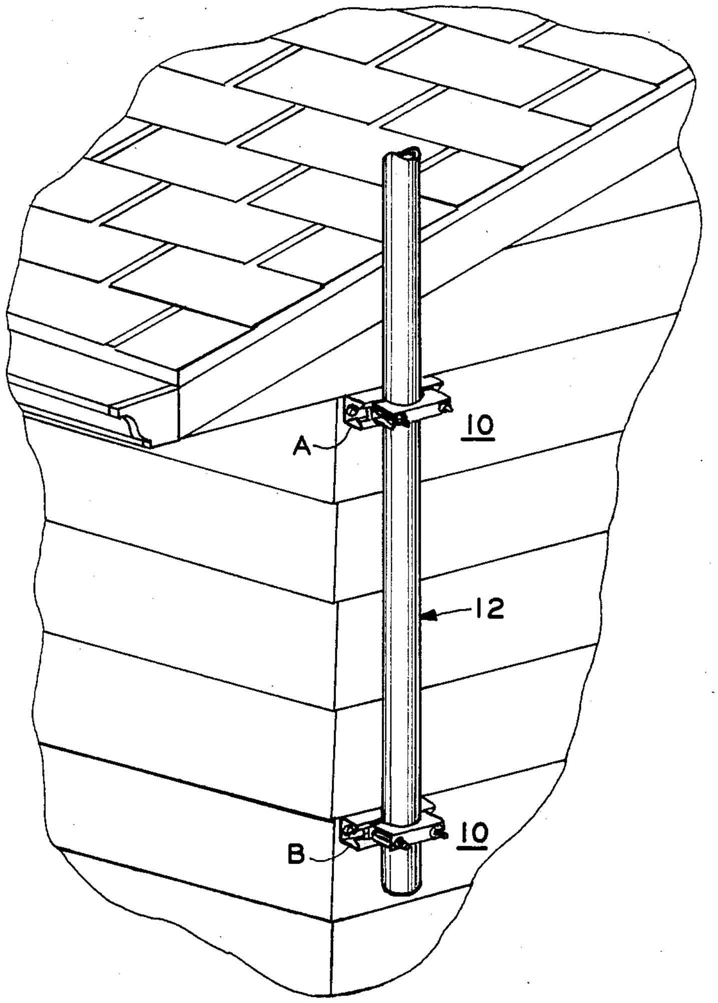
FIG. 3 is a perspective view of a structure for mounting a satellite dish antenna (dish not shown) on the corner of a house which employs two anchoring assemblies of the present invention.

FIG. 3 illustrates a structure for mounting a satellite dish (dish not shown) on the corner of a house (rake side) which employs two anchoring assemblies of the present invention (i.e., a top anchor A and a bottom anchor B). As can be seen, both the top and bottom anchors employ rather short bars 14. Short bars, typically on the order of about six inches, can be used when anchoring near the corner of a house if the corner post comprises at least two studs separated by a 2×4 stud spacer. If the corner post is not so constructed, the bar should span at least two wall studs which typically are spaced 16 or 24 inches apart.

Those skilled in the art will also appreciate the ease with which mast 12's vertical orientation can be adjusted when anchoring the mast with an anchoring assembly of the present invention. By simply sliding the untightened assembly with the mast in position along channel 20 of bar 16, the mast's vertical orientation can be adjusted until it is in its desired position, at which point the assembly can be tightened.

Figure 4:
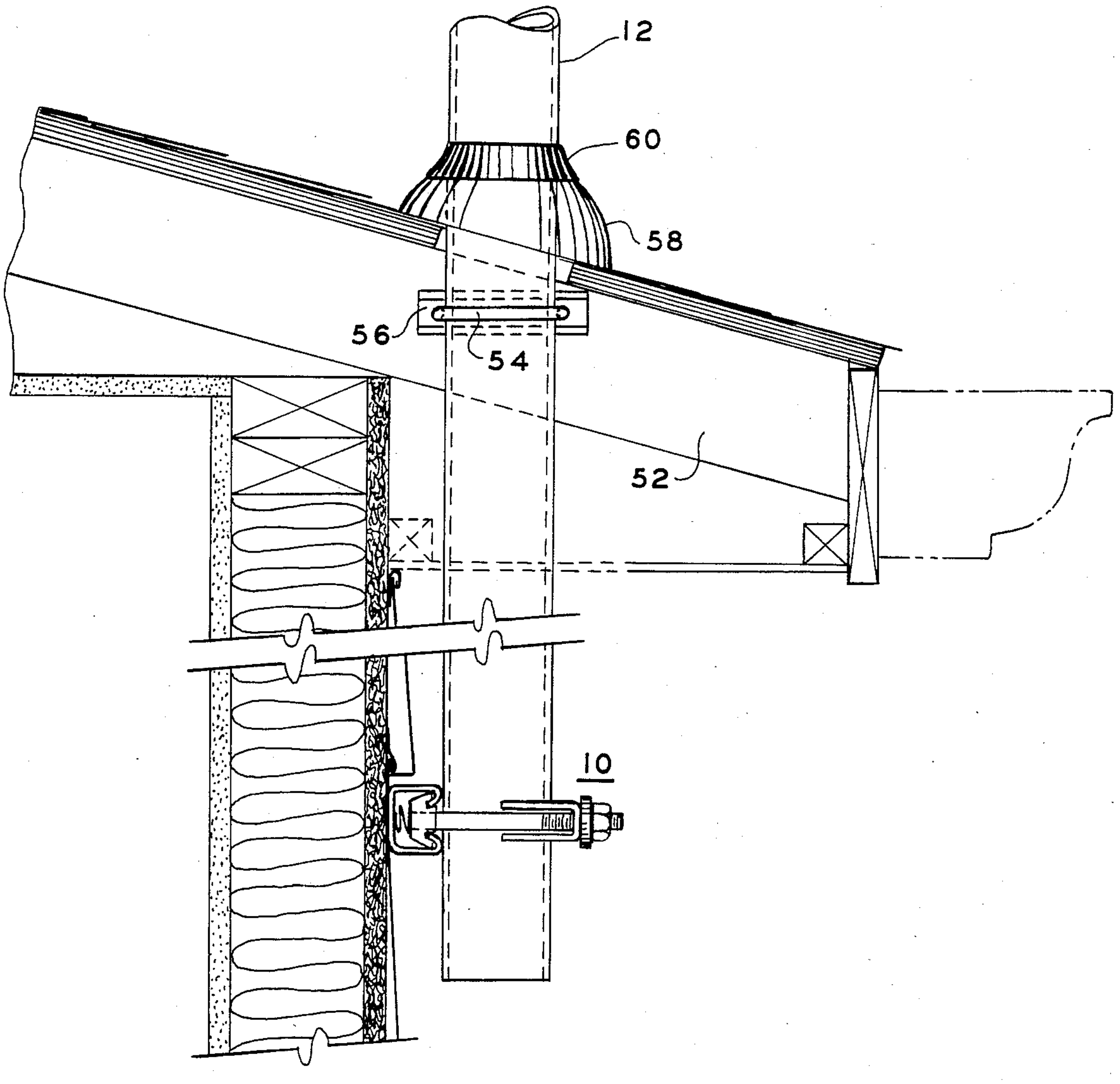
FIG. 4 is a sectional view of a structure for mounting a satellite dish (dish not shown) on the eave of a house.
Figure 5:
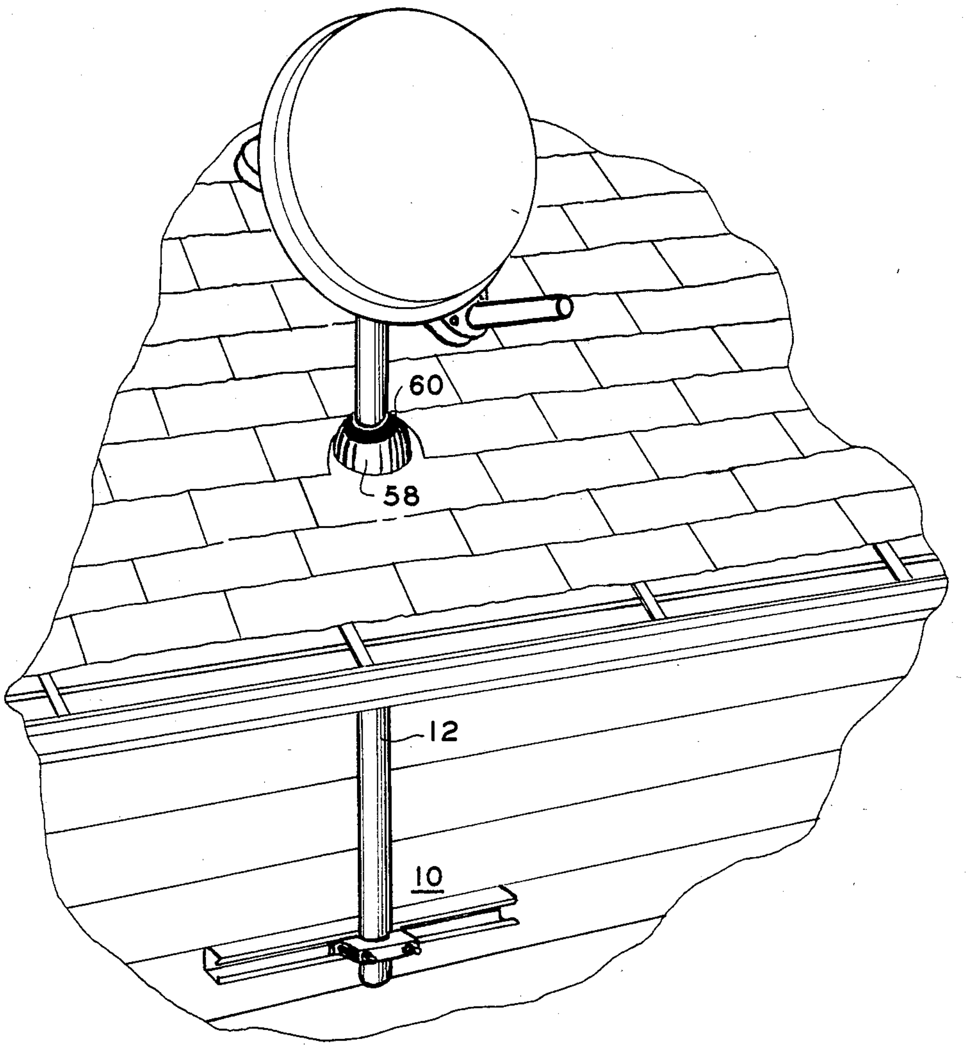
FIG. 5 is a perspective view of the mounting structure illustrated in FIG. 4.

FIGS. 4 and 5 illustrate a structure for mounting a satellite dish (dish shown only in FIG. 5) on the eave of a house through the roof's overhang. As in FIG. 3, a top and a bottom anchor are employed; however, in FIG. 4 the top anchor is attached to the overhang's rafter tail 52, not the building's side. In addition, it will be noted that the top anchor does not employ a bar anchoring assembly of the present invention, but rather, a threaded U-bolt 54 which envelops mast 12 and passes through two load bearing plates 56 (only one is visible in FIG. 4) which are located on opposite sides of rafter tail 52. The top anchor is tightened by threading nuts with lock washers onto the exposed ends of the U-bolts (not visible because on unexposed side of rafter tail 52). An anchoring assembly of the present invention could be employed at the top anchor point also, and such may, in fact, be preferable because of the ease with which the assembly may be adjusted to facilitate accurate positioning or orientation of the mast.

Returning to the figures, it can be seen that the bottom anchor employs a bar anchoring assembly of the present invention. If the mast is to be anchored at the building's corner, the anchoring assembly may use a short length of bar, such as that used in FIG. 3. Such would depend again on the corner's construction. If, however, the dish is to be anchored away from the building's corner, as depicted in FIG. 5, the bottom anchor's bar must again be long enough to span at least two wall studs.

It can also be seen in FIGS. 4 and 5 that water leakage around the mast into the house's soffit and fascia is prevented with conventional roof vent flashing 58 in conjunction with a standard neoprene storm gasket 60.

The following test data and results are further illustrative of the invention and its advantages. 0.6 meter and 1.0 meter satellite dishes were mounted on a test house with a structure similar to that illustrated in FIG. 3 and subjected to 50 and 100 mph winds. The 0.6 meter dish was parabolically shaped and made from aluminum. It was supported by a nominal 1-½ inch (1.900-inch O.D.×0.150-inch thick wall) steel pipe mast. The 1.0 meter dish was also parabolically shaped and made from aluminum. It was supported by a nominal 2-½ inch (2.890-inch O.D.×0.210-inch thick wall) galvanized steel pipe. The house's lattice frame was made from wood 2×4's which were assembled with 16D nails. The frame's studs spaced 24 inches apart and the frame was sheathed with ⅜-inch thick plywood. The house's dimensions were 12 ft.×24 ft. and it was 4 ft. high at the eaves. The distance between the top and bottom anchor along the mast on the 0.6 meter dish was 32 inches, and the distance along the mast between the top anchor and the satellite dish's mid-height centerline was 44 inches. With the 1 meter dish, the distance between the top and bottom anchor was 40 inches, and the distance between the top anchor and the satellite dish's mid-height centerline was 56 inches. The top and bottom anchoring assemblies employed bars similar to bar 16 illustrated in FIGS. 1 and 2, and they were made from 12-gauge painted steel having a length, width and depth of approximately 8"×1-⅝"×1-⅜", respectively. The bars were rigidly affixed to the test house with 3-inch long plates steel lag screws. Muffler clamps similar to clamp 16 of FIGS. 1 and 2 were also used to secure the mast to the bars. The clamp used in securing the 0.6 meter dish about its 1.9-inch O.D. pipe mast was formed from 0.085 inch thick formed steel having a length, width and side depth of approximately 3-½"×¾×2", respectively. The muffler clamp used in supporting the 1.0 meter satellite dish about its 3-inch O.D. pipe mast was formed from 0.127 inch thick formed steel having a length, width and side depth of approximately 4-½"×¾×3", respectively, ⅜-16 threaded steel stud nuts similar to stud nuts 18 of FIGS. 1 and 2 were used to fasten the bars and muffler clamps together about the pipe mast, and the assemblies were tightened with hex nuts and lock washers similar to nut 22 and lock washer 50 illustrated in FIGS. 1 and 2. The satellite dish was located normal to and downwind from the 13'6" diameter propeller of a 2100 horsepower aircraft engine which was used to generate the 50 and 100 mph winds. Wind speed at the test structure was measured with a pitot tube. Pipe mast movement due to movement of the test house was measured with a micrometer dial indicator which was attached to the anchor locations. Wind velocity was maintained during each test for at least 10 seconds. The 50 mph wind tests demonstrated that both the 0.6 meter and the 1.0 meter dish mounting structures would be able to maintain their respective dishes in preset alignment with a satellite. Total pointing error was less than 0.1°. In addition, the anchoring assemblies were able to withstand the 100 mph wind tests without losing the dish and without damaging the test house. Moreover, there was no relative torsional movement of any kind whatsoever between the masts and the anchoring assemblies in either the 50 or the 100 mph wind tests.

While the invention has been described in terms of preferred embodiments, the claims appended hereto are intended to encompass all embodiments which fall within the spirit of the invention.

What is claimed is:

1. An adjustable assembly for anchoring a cylindrically-shaped member subject to bending and torsional movement, said assembly comprising:

(a) a bar having a back portion, said back portion defining holes through which bolts or lag screws may be inserted to secure said bar to a rigid structure, said back portion integrally adjoining opposing, parallel sides which extend a predetermined depth out from the lengthwise edges of the back portion, each of said sides terminating in integral lips, said lips being directed inwardly towards the opposing side, said lips also defining a front opening area which is parallel to and opposing said back portion, said back portion, sides and lips defining an interior channel with side openings;

(b) two nuts disposed in the internal channel, said nuts being insertable into said channel through either side opening of said bar and slidable within the channel from side opening to the other side opening, said slidability enabling the nuts to be located by an installer at positions in the channel which facilitate precise positioning or alignment of the cylindrically-shaped member, each of said nuts also having a face and being sized and configured to be resistant to rotational movement about its face's axis in at least one direction when the face of the nut is parallel to the plane of the bar's back portion and facing the bar's front opening area;

(c) a clamp half having a base portion defining two bolt holes, the first bolt hole being adjacent to one end of the base portion and the second bolt hole being adjacent to the other end of the base portion, said clamp half also having two opposing planar and parallel sides extending out from the lengthwise edges of the base portion at right angles with respect to said base portion, said sides terminating in a fashion that defines an exposed edge having an arcuate portion which is sized to mate with a portion of the external surface of said cylindrically-shaped member to restrict torsional movement of said member within said arcuate portion; and (d) means for tightly securing said clamp, cylindrical member and bar together, said means including a first and second bolt, said first bolt having one end capable of being inserted through said first bolt hole and tightly affixed to said clamp half, said first bolt having another end capable of being tightly affixed to one of the nuts disposed in said channel, said second bolt also having one end capable of being inserted through said second bolt hole and tightly affixed to said clamp half, said second bolt also having another end capable of being tightly affixed to the other nut disposed in said channel, said nuts being spaced apart a distance at least equal to the cylinder member's outside diameter, the ends of said bolts being capable of being tightly affixed such that when so tightened (1) the cylinder member contacts the opposing lip areas of the bar located between the nuts, and (2) both arcuate edge portions of said clamp tightly engage the external surface of said cylinder member to restrict torsional movement of the cylinder member relative to said arcuate portions.

2. An adjustable assembly for anchoring a cylindrically-shaped member subject to torsional movement, said assembly comprising:

(a) a bar of predetermined gauge, length, width and depth, said bar having open ends of said width and depth, said bar also having a substantially planar back portion extending the length of said bar, said back portion defining holes through which bolts or lag screws may be inserted to secure said bar to a rigid structure, the lengthwise edges of said back portion integrally adjoining opposing, parallel and planar sides which extend said predetermined depth out from the lengthwise edges of the back portion at right angles with respect to said back portion, each of said sides terminating in integral lips at said predetermined depth, said lips being directed inwardly towards the opposing side and downwardly towards the back portion, said lips also extending the length of said sides so as to define a front opening area which is parallel to and opposing said back portion, said back portion, sides and lips defining an interior channel which extends the length of the bar, said open ends of the bar defining side openings to said channel;

(b) two nuts disposed in the internal channel defined by said bar, said nuts being insertable into said channel through either side opening of said bar and slidable within the channel from one side opening to the other side opening, said slidability enabling the nuts to be located by an installer at positions in the channel which facilitate precise positioning or alignment of the cylindrical-shaped member, each of said nuts also having a face and being sized and configured to be resistant to rotational movement about its face's axis in at least one direction when the face of the nut is parallel to the plane of the bar's back portion and facing the bar's front opening area;

(c) a clamp half having a base portion defining two symmetrically located bolt holes, the first bolt hole being located a predetermined distance from one end of the base portion and the second bolt hole being located said predetermined distance from the other end of the base portion, said clamp half also having two opposing planar and parallel sides extending out from the lengthwise edges of the base portion at right angles with respect to said base portion, said sides extending a predetermined distance and terminating in a fashion that defines an exposed edge having a symmetrical, centrally located arcuate portion, said arcuate edge portion being sized to mate with a portion of the external surface of said cylindrically-shaped member to restrict torsional movement of said member within said arcuate portion; and (d) means for tightly securing said clamp, cylindrical member and bar together, said means including a first and second bolt, said first bolt having one end capable of being inserted through said first bolt hole and tightly fastened to said clamp half, said first bolt having another end capable of being tightly fastened to one of the nuts disposed in said channel, said second bolt also having one end capable of being inserted through said second bolt hole and tightly fastened to said clamp half, said second bolt also having another end capable of being tightly fastened to the other nut disposed in said channel, said nuts being spaced apart a distance at least equal to the cylinder member's outside diameter, the ends of said bolts being capable of being tightly fastened such that when so tightened (1) the cylinder member rests up against the opposing lip areas of the bar located between the nuts, and (2) both arcuate edge portions of said clamp tightly engage the external surface of said cylinder member to restrict torsional movement of the cylinder member relative to said arcuate portions.

3. An assembly as recited in claim 1 further comprising springs attached to the nuts disposed in the internal channel, said springs urging the face of each nut up against the bar's lips to inhibit said rotational movement.

4. An assembly as recited in claim 1 wherein the first bolt is welded to the face of one of the nuts disposed in the internal channel and the second bolt is welded to the face of the other nut disposed in the internal channel, said welded nuts and bolts being referred to as stud nuts.

5. An assembly as recited in claim 1 wherein the first and second bolts are threaded.

6. An assembly as recited in claim 5 wherein the means for tightly securing said clamp, cylindrical member and bar together includes threaded nuts for tightly fastening the first and second bolts to the clamp half engaging the cylindrical member.

7. A lightweight mounting structure combination for a dish antenna, comprising:

an upright, vertically extending mast for supporting said dish antenna, said mast having an upper end for attachment to said dish and a lower end for anchoring to a rigid type structure;

a top anchor means for anchoring the mast's midsection to the rigid type structure; and a bottom anchor means for anchoring the mast's lower end to the rigid type structure, at least one of the top and bottom anchor means including:

(a) a bar having a back portion, said back portion defining holes through which bolts or lag screws may be inserted to secure said bar to a rigid structure, said back portion integrally adjoining opposing, parallel sides which extend a predetermined depth out from the lengthwise edges of the back portion, each of said sides terminating in integral lips, said lips being directed inwardly towards the opposing side, said lips also defining a front opening area which is parallel to and opposing said back portion, said back portion, sides and lips defining an interior channel with side openings;

(b) two nuts disposed in the internal channel, said nuts being insertable into said channel through either side opening of said bar and slidable within the channel from one side opening to the other side opening, said slidability enabling the nuts to be located by an installer at positions in the channel which facilitate precise positioning or alignment of the cylindrically-shaped member, each of said nuts also having a face and being sized and configured to be resistant to rotational movement about its face's axis in at least one direction when the face of the nut is parallel to the plane of the bar's back portion and facing the bar's front opening area;

(c) a clamp half having a base portion defining two bolt holes, the first bolt hole being adjacent to one end of the base portion and the second bolt hole being adjacent to the other end of the base portion, said clamp half also having two opposing planar and parallel sides extending out from the lengthwise edges of the base portion at right angles with respect to said base portion, said sides terminating in a fashion that defines an exposed edge having an arcuate portion which is sized to mate with a portion of the external surface of said cylindrically-shaped member to restrict torsional movement of said member within said arcuate portion; and (d) means for tightly securing said clamp, cylindrical member and bar together, said means including a first and second bolt, said first bolt having one end capable of being inserted through said first bolt hole and tightly affixed to said clamp half, said first bolt having another end capable of being tightly affixed to one of the nuts disposed in said channel, said second bolt also having one end capable of being inserted through said second bolt hole and tightly affixed to said clamp half, said second bolt also having another end capable of being tightly affixed to the other nut disposed in said channel, said nuts being spaced apart a distance at least equal to the cylinder member's outside diameter, the ends of said bolts being capable of being tightly affixed such that when so tightened (1) the cylinder member contacts the opposing lip areas of the bar located between the nuts, and (2) both arcuate edge portions of said clamp tightly engage the external surface of said cylinder member to restrict torsional movement of the cylinder member relative to said arcuate portions.

8. A method for installing a dish antennae mounting structure on the side or corner of a building through the building's roof overhang, said overhang having a roof rafter and roofing materials located over the rafter, the method comprising the steps of:

(a) providing a hole through the roof overhang, said hole being located such that an edge thereof is located in a vertical plane extending along a side of the roof rafter;

(b) inserting a cylindrical mast of the mounting structure for the dish antenna through the hole provided in the roof overhang;

(c) anchoring the mast's midsection to the roof rafter and the mast's lower end to at least two wall studs on the building's side or corner such that the mast is substantially plumb, said anchoring to either the roof rafter or the building's side being provided with an assembly comprising:

(i) a bar having a back portion, said back portion defining holes through which bolts or lag screws may be inserted to secure said bar to the roof rafter or wall studs on the building's side or corner, said back portion integrally adjoining opposing, parallel sides which extend a predetermined depth out from the lengthwise edges of the back portion, each of said sides terminating in integral lips, said lips being directed inwardly towards the opposing side, said lips also defining a front opening area which is parallel to and opposing said back portion, said back portion, sides and lips defining an interior channel with side openings;

(ii) two nuts disposed in the internal channel, said nuts being insertable into said channel through either side opening of said bar and slidable within the channel from one side opening to the other side opening, said slidability enabling the nuts to be located by an installer at positions in the channel which facilitate precise positioning or alignment of the cylindrically-shaped member, each of said nuts also having a face and being sized and configured to be resistant to rotational movement about its face's axis in at least one direction when the face of the nut is parallel to the plane of the bar's back portion and facing the bar's front opening area;

(iii) a clamp half having a base portion defining two bolt holes, the first bolt hole being adjacent to one end of the base portion and the second bolt hole being adjacent to the other end of the base portion, said clamp half also having two opposing planar and parallel sides extending out from the lengthwise edges of the base portion at right angles with respect to said base portion, said sides terminating in a fashion that defines an exposed edge having an arcuate portion which is sized to mate with a portion of the external surface of said cylindrically-shaped member to restrict torsional movement of said member within said arcuate portion; and (iv) means for tightly securing said clamp, cylindrical member and bar together, said means including a first and second bolt, said first bolt having one end capable of being inserted through said first bolt hole and tightly affixed to said clamp half, said first bolt having another end capable of being tightly affixed to one of the nuts disposed in said channel, said second bolt also having one end capable of being inserted through said second bolt hole and tightly affixed to said clamp half, said second bolt also having another end capable of being tightly affixed to the other nut disposed in said channel, said nuts being spaced apart a distance at least equal to the cylinder member's outside diameter, the ends of said bolts being capable of being tightly affixed such that when so tightened (1) the cylinder member contacts the opposing lip areas of the bar located between the nuts, and (2) both arcuate edge portions of said clamp tightly engage the external surface of said cylinder member to restrict torsional movement of the cylinder member relative to said arcuate portions; and (d) sealing the hole with the mast extending therethrough such that rain is prevented from entering the roof overhand around the hole.

9. A method for installing a dish antennae mounting structure on the side or corner of a building having wall studs and siding materials located over the studs, the method comprising the steps of:

(a) positioning a cylindrical mast of the mounting structure for supporting the dish antenna such that the mast extends vertically along the side of the building with its upper end extending above the building's roof; and (b) anchoring the mast's midsection and the mast's lower end to at least two wall studs on the building's side or corner such that the mast is substantially plumb, said anchoring being provided at either the mast's midsection or lower end with an assembly comprising:

(i) a bar extending at least two wall studs, said bar having a back portion, said back portion defining holes through which bolts or lag screws may be inserted to secure said bar to the wall studs on the building's side or corner, said back portion integrally adjoining opposing, parallel sides which extend a predetermined depth out from the lengthwise edges of the back portion, each of said sides terminating in integral lips, said lips being directed inwardly towards the opposing side, said lips also defining a front opening area which is parallel to and opposing said back portion, said back portion, sides and lips defining an interior channel with side openings;

(ii) two nuts disposed in the internal channel, said nuts being insertable into said channel through either side opening of said bar and slidable within the channel from one side opening to the other side opening, said slidability enabling the nuts to be located by an installer at positions in the channel which facilitate precise positioning or alignment of the cylindrically-shaped member, each of said nuts also having a face and being sized and configured to be resistant to rotational movement about its face's axis in at least one direction when the face of the nut is parallel to the plane of the bar's back portion and facing the bar's front opening area;

(iii) a clamp half having a base portion defining two bolt holes, the first bolt hole being adjacent to one end of the base portion and the second bolt hole being adjacent to the other end of the base portion, said clamp half also having two opposing planar and parallel sides extending out from the lengthwise edges of the base portion at right angles with respect to said base portion, said sides terminating in a fashion that defines an exposed edge having an arcuate portion which is sized to mate with a portion of the external surface of said cylindrically-shaped member to restrict torsional movement of said member within said arcuate portion; and (iv) means for tightly securing said clamp, cylindrical member and bar together, said means including a first and second bolt, said first bolt having one end capable of being inserted through said first bolt hole and tightly affixed to said clamp half, said first bolt having another end capable of being tightly affixed to one of the nuts disposed in said channel, said second bolt also having one end capable of being inserted through said second bolt hole and tightly affixed to said clamp half, said second bolt also having another end capable of being tightly affixed to the other nut disposed in said channel, said nuts being spaced apart a distance at least equal to the cylinder member's outside diameter, the ends of said bolts being capable of being tightly affixed such that when so tightened (1) the cylinder member contacts the opposing lip areas of the bar located between the nuts, and (2) both arcuate edge portions of said clamp tightly engage the external surface of said cylinder member to restrict torsional movement of the cylinder member relative to said arcuate portions.

* * * * *

UNITED STATES PATENT AND TRADEMARK OFFICE

CERTIFICATE OF CORRECTION

PATENT NO. : 4,595,165

DATED : June 17, 1986

INVENTOR(S) : James D. Klingensmith et al.

It is certified that error appears in the above-identified patent and that said Letters Patent is hereby corrected as shown below:

| | |
|---|---|
| Col. 5, line 12 | After "studs" insert --were--. |
| Col. 5, line 29 | Change "plates" to --plated--. |
| Col. 5, line 34 | Change "3/4" to --3/4"--. |
| Col. 5, line 38 | Change "3/4" to --3/4"--. |
| Col. 6, line 19<br>Claim 1 | After "from" insert --one--. |
| Col. 7, line 27<br>Claim 2 | Change "cylindrical" to --cylindrically--. |
| Col. 10, line 46<br>Claim 8 | Change "overhand" to --overhang--. |

Signed and Sealed this

Thirteenth Day of January, 1987

*Attest:*

DONALD J. QUIGG

*Attesting Officer*

*Commissioner of Patents and Trademarks*